(12) United States Patent
Kocon (10) Patent No.: US 11,239,744 B2
(45) Date of Patent: Feb. 1, 2022

(54) ACTIVE MONOLITHIC SNUBBER DESIGN

(71) Applicant: TEXAS INSTRUMENTS INCORPORATED, Dallas, TX (US)

(72) Inventor: Christopher Kocon, Mountain Top, PA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/848,523

(22) Filed: Apr. 14, 2020

(65) Prior Publication Data

US 2021/0320583 A1 Oct. 14, 2021

(51) Int. Cl.
*H02M 1/34* (2007.01)

(52) U.S. Cl.
CPC .............. *H02M 1/34* (2013.01); *H02M 1/342* (2021.05)

(58) Field of Classification Search
CPC ......... H02M 1/34; H02M 1/341; H02M 1/342
See application file for complete search history.

(56) References Cited

U.S. PATENT DOCUMENTS

| | | | | |
|---|---|---|---|---|
| 6,078,509 A * | 6/2000 | Jacobs | .............. | H02M 3/33561 363/21.18 |
| 9,236,789 B1 * | 1/2016 | Li | ........................... | H02M 1/00 |
| 2007/0297202 A1 * | 12/2007 | Zargari | .................. | H02M 1/32 363/50 |
| 2012/0127762 A1 * | 5/2012 | Reddy | .............. | H02M 3/33592 363/21.04 |
| 2019/0380179 A1 * | 12/2019 | Cheng | .................. | F21V 23/003 |

OTHER PUBLICATIONS

Todd, Philip C. "Snubber Circuits: Theory, Design and Application." May 1993.
Severns, Rudy. "Design of Snubbers for Power Circuits." Analog Applications Journal. 2Q 2012. High-Performance Analag Products.
Taylor, Robert et al. "Controlling switch-node ringing in synchronous buck converters." Analog Applications Journal. 2Q 2012. High-Performance Analog Products. Power Management.
"Controlling switch-node ringing in DC/DC converters." EDN. Feb. 21, 2016. https://www.edn.com/controlling-switch-node-ringing-in-dc-dc-converters/.
"Ringing at switching nodes." Rohm Tech Web: Technical Information Site of Power Supply Design. Sep. 17, 2017. https://techweb.rohm.com/knowledge/dcdc/dcdc_pwm/dcdc_pwm03/3164.

\* cited by examiner

*Primary Examiner* — Adolf D Berhane
(74) *Attorney, Agent, or Firm* — Ray A. King; Charles A. Brill; Frank D. Cimino (57) ABSTRACT

A semiconductor switching circuit associated with a power semiconductor circuit is described. The semiconductor switching circuit includes a snubber circuit comprising a snubber switch element that comprises a first terminal configured to couple to a supply node associated with the power semiconductor circuit and a second terminal configured to couple to a switch node associated with the power semiconductor circuit. In some aspects, the snubber switch element is configured to bypass a ringing voltage at the switch node associated with the power semiconductor circuit to the supply node associated with the power semiconductor circuit. In some aspects, the ringing voltage at the switch node comprises a voltage that is greater than a supply voltage associated with the supply node.

22 Claims, 4 Drawing Sheets

ACTIVE MONOLITHIC SNUBBER DESIGN

TECHNICAL FIELD

The present disclosure relates to snubber circuits, and in particular, to systems and methods to reduce ringing associated with semiconductor switches using active monolithic snubber circuits.

BACKGROUND

Power converters are moving toward higher frequencies to reduce converter size. As switching frequency increases, the power converters also employ faster switches with improved switching speed to keep switching losses contained. However, the higher frequency switching in converters used in industrial, automotive, and communication infrastructure equipment can create ringing (e.g., switch-node ringing), with spikes exceeding the voltage ratings of the switches. Uncontrolled spikes can reduce system reliability or even result in outright failure.

SUMMARY

In one aspect of the description, a semiconductor switching circuit comprises a snubber circuit comprising a snubber switch element that comprises a first terminal configured to couple to a supply node associated with the power semiconductor circuit and a second terminal configured to couple to a switch node associated with a power semiconductor circuit. The snubber switch element is configured to bypass a ringing voltage at the switch node associated with the power semiconductor circuit to the supply node associated with the power semiconductor circuit. In some aspects, the ringing voltage at the switch node comprises a voltage that is greater than a supply voltage at the supply node.

In one aspect of the description, a monolithic integrated circuit comprises a main switch element comprising a first terminal configured to couple to a supply node associated with a power semiconductor circuit and a second terminal configured to couple to a switch node associated with the power semiconductor circuit. The main switch element is configured to be switched, in order to couple or decouple a supply voltage associated with the supply node to the switch node. The monolithic integrated circuit further comprises a snubber circuit comprising a snubber switch element that comprises a first terminal configured to couple to the supply node and a second terminal configured to couple to the switch node. The snubber switch element is configured to bypass a ringing voltage at the switch node associated with the power semiconductor circuit to the supply node associated with the power semiconductor circuit, wherein the ringing voltage at the switch node comprises a voltage that is greater than the supply voltage associated with the supply node.

In one aspect of the description, a method coupling or decoupling a supply voltage from a supply node associated with the power semiconductor circuit to a switch node associated with the power semiconductor circuit, by switching a main switch element. In some aspects, first terminal of the main switch element is coupled to the supply node and a second terminal of the main switch element is coupled to the switch node. The method further comprises bypassing a ringing voltage at the switch node that is associated with the switching of the main switch element, to the supply node, using a snubber switch element associated with a snubber circuit. In some aspects, a first terminal of the snubber switch element is coupled to the supply node and the second terminal of the snubber switch element is coupled to the switch node. In some aspects, the ringing voltage at the switch node comprises a voltage that is greater than a supply voltage at the supply node.

DETAILED DESCRIPTION

The present description is described with reference to the attached figures. The figures may not be drawn to scale and they are provided merely to illustrate the description. Several aspects of the description are described below with reference to example applications for illustration. Numerous specific details, relationships, and methods are set forth to provide an understanding of the description. The present description is not limited by the illustrated ordering of acts or events, as some acts may occur in different orders and/or concurrently with other acts or events. Furthermore, not all illustrated acts or events are required to implement a methodology in accordance with the present description.

As indicated above, high frequency switching in converters results in switch node ringing. In some aspects, switch node ringing refers to the generation of high voltage spikes at switch nodes associated with converters circuits due to the switching of the switches associated with the converter circuits. In some aspects, converter circuits comprise supply nodes and switch nodes. In some aspects, a supply node comprises a node that is coupled to an input supply source/input capacitor associated with the converter circuit. In some aspects, the supply node comprises a stiff node that is not susceptible to voltage/current variations. In some aspects, a switch node comprises a node to which a voltage/current associated with the supply node is coupled/decoupled by a switch element associated with the converter circuit. A switch element/switching element may refer to any semiconductor switching device that switches ON or switches OFF, for example, metal oxide semiconductor field effect transistors (MOSFETs), bipolar junction transistors (BJTs), diodes etc. In some aspects, due to the switching of the switch elements, high voltage spikes appear at the switch node, which is herein referred to as ringing, circuit ringing or switch-node ringing. In some aspects, the high voltage spikes comprise a ringing voltage. In some aspects, the ringing voltage comprises a voltage that is greater than a supply voltage associated with the supply node.

In some aspects, circuit ringing limits the use of lower voltage devices in converter circuits thereby limiting converter efficiency. In particular, in some aspects, due to circuit ringing, power converter circuits use higher voltage switches in order to keep them from high power loss combined with heating and reliability issues when they are being avalanched. Therefore, it is important to reduce the circuit ringing in converter circuits. In some aspects, snubber circuits are utilized to bypass the ringing voltage at the switch nodes, thereby enabling to reduce ringing at the switch nodes. Current implementations of snubber circuits comprise a passive snubber circuit comprising a snubber capacitor and a snubber resistor that is coupled to the switch node, in order to bypass the ringing voltage at the switch node. The passive snubber circuit is coupled to the switch node at one end and to a circuit ground at the other end, thereby enabling to bypass the ringing voltage at the switch node to the circuit ground. In some aspects, the snubber capacitor and the snubber resistor comprise discrete components that are coupled externally (i.e., not part of an integrated chip (IC) comprising the switch element) to the switch node associated with the converter circuit. While this approach reduces ringing, utilizing the external passive snubber circuits contributes higher inductance, which results in utilizing larger capacitors to catch the ringing efficiently, thereby increasing the size of the snubber circuits. Further, bypassing the ringing voltage to the circuit ground results in a wastage of energy.

To overcome the disadvantages described above, a semiconductor switching circuit comprising a snubber circuit configured to reduce circuit ringing is described. In some aspects the semiconductor switching circuit is a part of a power semiconductor circuit. In some aspects, the power semiconductor circuit may comprise power converter circuits like boost converters, buck converters etc. However, in other aspects, the power semiconductor circuit may comprise any semiconductor circuits comprising one or more switch elements. The snubber circuit is configured to bypass a ringing voltage at a switch node associated with the power semiconductor circuit to a supply node associated with the power semiconductor circuit. In some aspects, the ringing voltage at the switch node is associated with a switching of a main switch element associated with the semiconductor switching circuit. The snubber circuit comprises a snubber switch element that is configured to bypass the ringing voltage at the switch node associated with the power semiconductor circuit to the supply node associated with the power semiconductor circuit. In some aspects, the snubber switch element comprises a monolithic switch element that is included on a monolithic integrated circuit (IC) comprising the main switch element. In some aspects, implementing the main switch element and the snubber switch element on a monolithic enables to reduce a size of the power semiconductor circuit. Further, bypassing the ringing voltage to the supply node enables to conserve energy associated with the power semiconductor circuit in some aspects. In some aspects, the snubber circuit further enables to reduce electromagnetic interference (EMI) in semiconductor circuits, as EMI is mostly caused by ringing. Reducing EMI is especially important for automotive, industrial and any other sensitive applications.

Figure 1A:
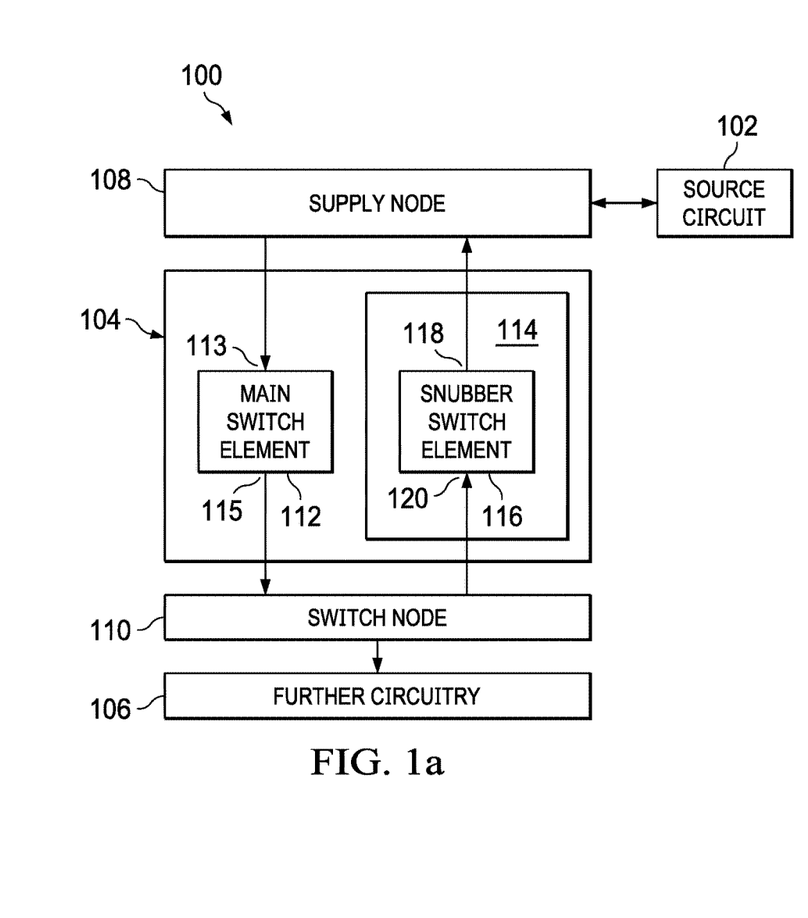
FIG. 1a is a block diagram of a power semiconductor circuit, according to one aspect of the description.

FIG. 1a is a block diagram of a power semiconductor circuit 100, according to one aspect of the description. In some aspects, the power semiconductor circuit 100 may comprise power converter circuits like boost converters, buck converters etc. However, in other aspects, the power semiconductor circuit 100 may comprise any semiconductor circuits comprising one or more switch elements. In some aspects, the one or more switch elements may include silicon based semiconductor switches, wide bandgap semiconductor switches etc. The power semiconductor circuit 100 comprises a source circuit 102, a semiconductor switching circuit 104 comprising one or more switch elements and further circuitry 106. In some aspects, the one or more switch elements associated with the semiconductor switching circuit 104 is configured to be switched, in order to provide a voltage/current associated with the source circuit 102 to the further circuitry 106. In some aspects, the source circuit 102 may comprise a voltage source/current source and an input capacitor. In some aspects, the further circuitry 106 may comprise one or more switch elements, capacitors, resistors etc. that couples the source circuit 102 to a load circuit. The power semiconductor circuit 100 further comprises a supply node 108 and a switch node 110. The supply node 108 comprises a point/junction or a circuit path that is coupled to the source circuit 102. Throughout the description, the term "coupled" may refer to directly coupled or indirectly coupled. In some aspects, the supply node 108 comprises what is sometimes referred to as a stiff node or a firm node that is coupled to a power supply circuit (e.g., the source circuit 102) and that is not susceptible to voltage/current variations. The switch node 110 comprises a point/junction or a circuit path to which the voltage/current associated with the source circuit 102 is provided by the one or more switch elements associated with the semiconductor switching circuit 104. In some aspects, the further circuitry 106 is coupled to the switch node 110, in order to receive the voltage/current associated with the source circuit 102 at the further circuitry 104.

The semiconductor switching circuit 104 comprises a main switch element 112. In some examples, the main switch element 112 may comprise active switches like metal oxide semiconductor field effect transistor (MOSFET), bipolar junction transistor (BJT) etc. Alternatively, in other examples, the main switch element 112 may comprise a diode. A first terminal 113 of the main switch element 112 is configured to couple to the supply node 108 and a second terminal 115 of the main switch element 112 is configured to couple to the switch node 110 associated with the power semiconductor circuit 100. Further, the main switch circuit 112 is configured to be switched (i.e., switched ON or switched OFF), in order to couple/decouple a supply voltage associated with the supply node 108 to the switch node 110. In some aspects, the supply voltage $V_{supply}$ associated with the supply node 108 is same as a supply voltage associated with the source circuit 102. In some aspects, due to the switching of the main switch element 112, a ringing voltage (e.g., a voltage spike) that is greater than the supply voltage appears at the switch node 110 (both during turn ON and turn OFF of the main switch element 112). In other aspects, however, the ringing voltage may appear at the switch node 110 due to other reasons.

The semiconductor switching circuit 104 further comprises a snubber circuit 114 comprising a snubber switch element 116. In some examples, the snubber switch element 116 may comprise active switches like metal oxide semiconductor field effect transistor (MOSFET), bipolar junction transistor (BJT) etc. Alternatively, in other examples, the snubber switch element 116 may comprise other switch elements like a diode. A first terminal 118 of the snubber switch element 116 is configured to couple to the supply node 108 and a second terminal 120 of the snubber switch element 116 is configured to couple to the switch node 110 associated with the power semiconductor circuit 100. In some aspects, although not shown, the second terminal 120 of the snubber switch element 116 may be coupled to the second terminal 115 of the main switch element 112, in order to couple second terminal 120 of the snubber switch element 116 to the switch node 110. In other words, the second terminal 120 of the snubber switch element 116 is configured to couple to the switch node 110 by coupling to the second terminal 115 of the main switch element 112. Alternatively, in other aspects, the second terminal 120 of the snubber switch element 116 may be configured to couple to the switch node 110 without coupling to the second terminal 115 of the main switch element 112. Further, the snubber switch element 116 is configured to bypass/conduct the ringing voltage at the switch node 110, to the supply node 108. By bypassing, it means conducting the ringing voltage on a different path, thereby bypassing other circuit paths coupled to the switch node 110. In some aspects, bypassing the ringing voltage back to the supply node 108 enables to conserve energy associated with the power semiconductor circuit 110.

In some examples, the main switch element 112 and the snubber switch element 116 comprise a same type of switch element. For instance, both the main switch element 112 and the snubber switch element 116 may comprise N MOSFETs. However, in other examples, the main switch element 112 and the snubber switch element 116 may comprise different types of switch elements. For instance, the main switch element 112 may comprise an N MOSFET and the snubber switch element 116 may comprise a diode. In some examples, the main switch element 112 and the snubber circuit 114 comprise monolithic switch elements that are included on a same monolithic integrated circuit (IC). In some aspects, the monolithic IC may further include the supply node 108 and the switch node 110. Alternatively, in other examples, the main switch element 112 and the snubber circuit 114 may comprise monolithic switch elements that are included on different ICs. Further, in some examples, the main switch element 112 and the snubber switch element 116 may be implemented as discrete components on a printed circuit board (PCB). In the examples where the main switch element 112 and the snubber circuit 114 are on the same monolithic IC, the main switch element 112 and the snubber switch element 116 associated with the snubber circuit 114 may comprise sections of a same monolithic switch element. In other words, a section of a monolithic switch element comprising the main switch element 112 is dedicated for the snubber switch element 116. However, in other examples, the main switch element 112 and the snubber switch element 116 may be implemented separately on a same monolithic IC. In some aspects, implementing both the main switch circuit 112 and the snubber switch element 116 on the same monolithic IC reduces an inductance between the switch node 110 and the snubber switch element 116. In some aspects, low inductance enables the snubber switching to be perfectly timed with the ringing (i.e., without any delay), thereby enabling to efficiently reduce ringing in high frequency switching converters.

In some aspects, when the snubber switch element 116 comprises an active switch element like MOSFET, snubber switch element 116 further comprises a third, different terminal (not shown), for example, a gate of a MOSFET. In some aspects, the third terminal of the snubber switch element 116 is coupled to the second terminal 120 of the snubber switch element 116, thereby forming a snubber diode configuration, further details of which are given in an aspect below. In such aspects, the snubber switch element 116 acts as a snubber diode 116. In some aspects, the snubber diode 116 is configured to bypass the ringing voltage to the supply node 108, based on conducting current when a voltage at the switch node 110 exceeds the supply voltage at the supply node 108. In such aspects, the snubber diode 116 is configured to conduct current as long as the voltage at the switch node 110 is greater than the supply voltage at the supply node 108.

Alternatively, in other aspects, the third terminal of the snubber switch element 116 is configured to be controlled to selectively switch ON the snubber switch element 116, thereby forming an active switch configuration, in order to bypass the ringing voltage to the supply node 108. In some aspects, the third terminal of the snubber switch element 116 may be controlled via a control circuit (not shown). The control circuit may be implemented as a processor or machine executing stored computer-executable instructions, hardware, firmware, and so on. In some aspects, the control circuit may include a gate driver circuit, for example, in the case of MOSFETS. However, in other aspects, the control circuit may be implemented differently, depending on the type of the snubber switch element 116. In some aspects, the snubber switch element 116 is configured to be switched ON by the control circuit after a predefined delay after the switch ON or switch OFF of the main switch element 112, in order to bypass the ringing voltage at the switch node 110 to the supply node 108. Alternatively, in other aspects, the snubber switch element 116 is configured to be switched ON by the control circuit when a voltage at the switch node 110 exceeds a predefined ringing voltage threshold. In some aspects, the predefined ringing voltage threshold may comprise a voltage that is greater than the supply voltage associated with the supply node 108. However, in other aspects, the snubber switch element 116 may be configured to be switched ON by the control circuit based on other criteria. In the active switch configuration, in some aspects, the snubber switch element 116 may be configured to perform regular current conduction, after the ringing voltage is bypassed to the supply node 108, but before a next switching of the main switching circuit 112.

Further, in some aspects, the snubber switch element 116 may comprise a diode element (e.g., a regular diode) that is configured to bypass the ringing voltage to the supply node 108. In some aspects, the snubber switch element 116 may comprise one or more snubber switch elements in parallel. In some aspects, the one or more parallel snubber switch elements are coupled between the switch node 110 and the supply node 108 in one or more parallel snubber circuit paths, respectively. Further, in some aspects, a set of snubber switch elements of the one or more parallel snubber switch elements may comprise one or more snubber switch elements, respectively, coupled in series with one another. When the snubber switch element 116 comprises a diode or a snubber diode as explained above, for each parallel snubber circuit path, only ringing energy above $V_{supply}$+(diode drop)*number of diodes in series, will be provided to the supply node 108.

Figure 1B:
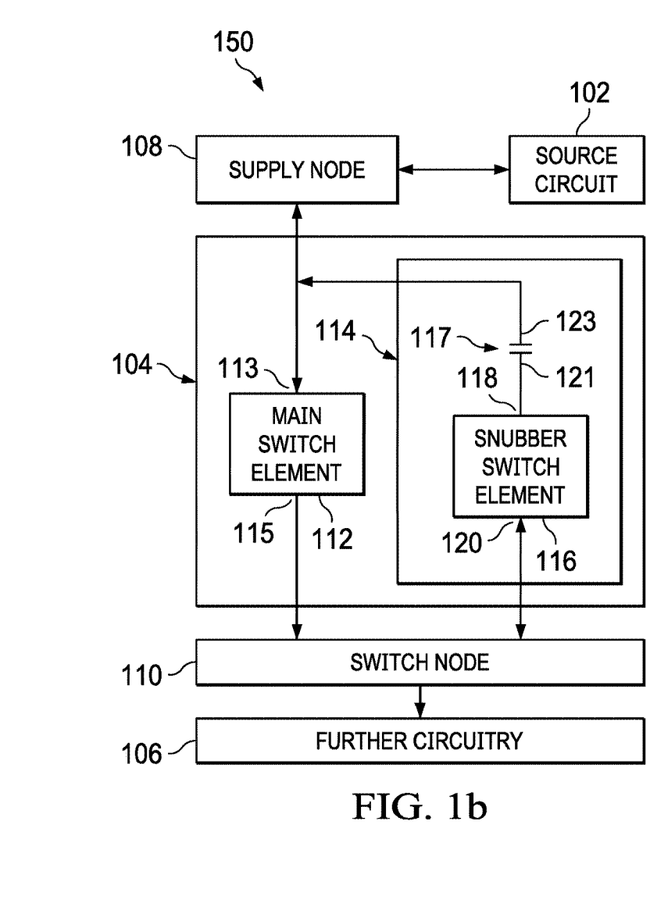
FIG. 1b is a block diagram of a power semiconductor circuit, according to another aspect of the description.

In some aspects, the first terminal of 113 of the main switch element 112 and the first terminal of 118 of the snubber switch element 116 are configured to couple to the supply node 108 via separate circuit paths as shown in FIG. 1a. Alternatively, in other aspects, the first terminal 118 of the snubber switch element 116 may be configured to couple to the supply node 108 via a same circuit path that couples the first terminal 113 of the main switch element 112 to the supply node 110, as shown in the power semiconductor circuit 150 in FIG. 1b. In such aspects, as can be seen in FIG. 1b, the snubber circuit 114 further comprises a snubber capacitor element 117. The snubber capacitor element 117 comprises a first terminal 121 coupled to the first terminal 118 of the snubber switch element 116 and a second, different, terminal 123 configured to couple to the first terminal 113 of the main switch element 112, in order to couple the first terminal 118 of the snubber switch element 116 to the supply node 108 via the same circuit path that couples the first terminal 113 of the main switch element 112 to the supply node 108. In some aspects, the snubber capacitor element 116 comprises a monolithic capacitor realized using common IC layout techniques. In some aspects, the snubber capacitor element 117 is configured to store energy associated with the ringing voltage at the switch node 110, prior to releasing the energy to the supply node 108. All the other elements of the power semiconductor circuit 150 in FIG. 1b is similar in structure/function to the elements in FIGS. 1a and 1s therefore not repeated herein. In some aspects, utilizing the same circuit path for the main switch element 112 and the snubber switch element 116 enables to avoid implementing separate pins in a monolithic IC that comprises the main switch element 112 and the snubber switch element 116.

Figure 2A:
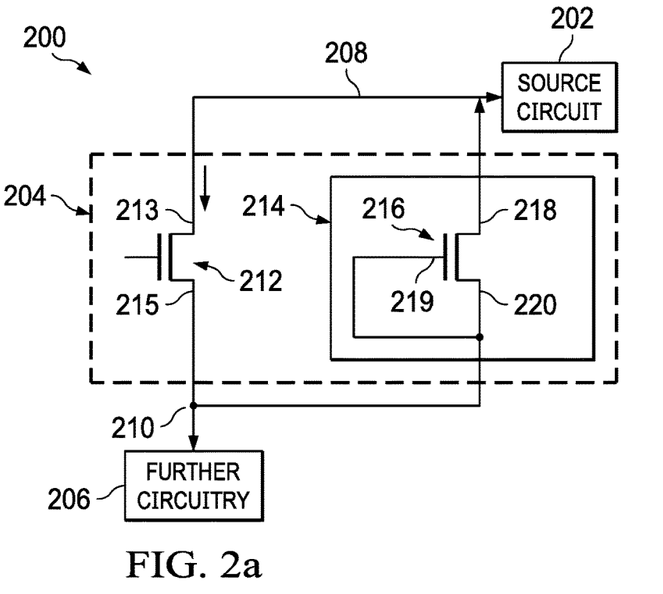
FIGS. 2a-2d are example implementations of a power semiconductor circuit, according to various aspects described in the description.

FIG. 2a is an example implementation of a power semiconductor circuit 200, according to one aspect of the description. The power semiconductor circuit 200 comprises one possible way of implementation of the power semiconductor circuit 100 in FIG. 1a and therefore, all the features of the power semiconductor circuit 100 in FIG. 1a is also applicable to the power semiconductor circuit 200 in FIG. 2a. The power semiconductor circuit 200 comprises a source circuit 202, a semiconductor switching circuit 204 comprising one or more switch elements and further circuitry 206. In some aspects, the one or more switch elements associated with the semiconductor switching circuit 204 is configured to be switched, in order to provide a voltage/current associated with the source circuit 202 to the further circuitry 206. The power semiconductor circuit 200 further comprises a supply node 208 and a switch node 210. The supply node 208 comprises a point/junction or a circuit path that is coupled to the source circuit 202. In some aspects, the supply node 208 comprises a stiff node that is not susceptible to voltage/current variations. The switch node 210 comprises a point/junction or a circuit path to which the voltage/current associated with the source circuit 202 is provided by the one or more switch elements associated with the semiconductor switching circuit 204.

The semiconductor switching circuit 204 comprises a main switch element 212 and a snubber circuit 214. The snubber circuit 214 comprises a snubber switch element 216. In this example, the main switch element 112 comprises an N-MOSFET that forms a main MOSFET 212. Further, the snubber switch element 216 comprises an N-MOSFET that forms a snubber MOSFET 216. However, in other examples, the main switch element 212 and the snubber switch element 216 may comprise other switch elements like, P-MOSFETs, diodes, BJTs etc. Further, in some examples, the main switch element 212 and the snubber switch element 216 may comprise different types of switch elements. For instance, the main switch element 212 may comprise an N-MOSFET and the snubber switch element 216 may comprise a diode.

Referring back to FIG. 2a, a drain terminal 213 of the main MOSFET 212 is configured to couple to the supply node 208 and a source terminal 215 of the main MOSFET 212 is configured to couple to the switch node 210 associated with the power semiconductor circuit 200. In other examples, when the main switch element 212 comprise other types of switches, the terminals to be coupled to the switch node 210 and the supply node 208 are chosen accordingly. The main MOSFET 212 is configured to be switched (i.e., switched ON or switched OFF), in order to couple/decouple a supply voltage associated with the supply node 208 to the switch node 210. In some aspects, the supply voltage $V_{supply}$ associated with the supply node 208 is same as a supply voltage associated with the source circuit 202. In some aspects, due to the switching of the main MOSFET 212, a ringing voltage (e.g., a voltage spike) that is greater than the supply voltage appears at the switch node 210 (both during turn ON and turn OFF of the main MOSFET 212).

Further, a drain terminal 218 of the snubber MOSFET 216 is configured to couple to the supply node 208 and a source terminal 220 of the snubber MOSFET 216 is configured to couple to the switch node 210 associated with the power semiconductor circuit 200. In other examples, when the snubber switch element 212 comprise other types of switches, the terminals to be coupled to the switch node 210 and the supply node 208 are chosen accordingly. In some aspects, the source terminal 220 of the snubber MOSFET 216 may be coupled to the source terminal 215 of the main MOSFET 212, in order to couple the source terminal 220 of the snubber MOSFET 216 to the switch node 210. In some aspects, the snubber MOSFET 216 is configured to bypass the ringing voltage at the switch node 210 that is associated with the switching of the main MOSFET 212, to the supply node 208. In some aspects, bypassing the ringing voltage back to the supply node 208 enables to conserve energy associated with the power semiconductor circuit 200.

In order to enable the snubber MOSFET 216 to bypass the ringing voltage, a gate terminal 219 of the snubber MOSFET 216 is coupled to the source terminal 220 of the snubber MOSFET 216. In such aspects, the snubber MOSFET 216 assumes a diode configuration, thereby forming a snubber diode 216. In some aspects, coupling the gate terminal 219 of the snubber MOSFET 216 to the source terminal 220 of the snubber MOSFET 216, in turn facilitates to couple the gate terminal 219 of the snubber MOSFET 216 to the switch node 210. In such aspects, the snubber diode 216 is configured to bypass the ringing voltage to the supply node 208, based on conducting current when a voltage at the switch node 210 exceeds the supply voltage at the supply node 208. In such aspects, the snubber diode 216 is configured to conduct current as long as the voltage at the switch node 210 is greater than the supply voltage at the supply node 208.

In some examples, the main MOSFET 212 and the snubber MOSFET 216 comprise monolithic switch elements that are included on a same monolithic integrated circuit (IC). Alternatively, in other examples, the main MOSFET 212 and the snubber MOSFET 216 may comprise monolithic switch elements that are included on different ICs. Further, in some examples, the main MOSFET 212 and the snubber MOSFET 216 may be implemented as discrete components on a printed circuit board (PCB). In the examples where the main MOSFET 212 and the snubber MOSFET 216 are on the same monolithic IC, the main MOSFET 212 and the snubber MOSFET 216 may comprise sections of a same monolithic switch element. In other words, a section of a monolithic switch element comprising the main MOSFET 212 is dedicated for the snubber MOSFET 216. In such examples, the main MOSFET 212 and the snubber MOSFET 216 may comprise a common source terminal that couples to the switch node 210 and separate drain terminals to couple to the supply node 208. However, in other examples, the main MOSFET 212 and the snubber MOSFET 216 may be implemented separately on a same monolithic IC. In some aspects, implementing both the main MOSFET 212 and the snubber MOSFET 212 on the same monolithic IC reduces an inductance between the switch node 210 and the snubber MOSFET 216, thereby enabling to efficiently reduce ringing in high frequency switching converters.

In some aspects, although not shown, the snubber MOSFET 216 may comprise one or more snubber MOSFETs in parallel. In some aspects, the one or more parallel snubber MOSFETS are coupled between the switch node 210 and the supply node 208 in one or more parallel snubber circuit paths, respectively. Further, in some aspects, a set of snubber MOSFETs of the one or more parallel snubber MOSFETs may comprise one or more snubber MOSFETs, respectively, coupled in series with one another.

Figure 2B:
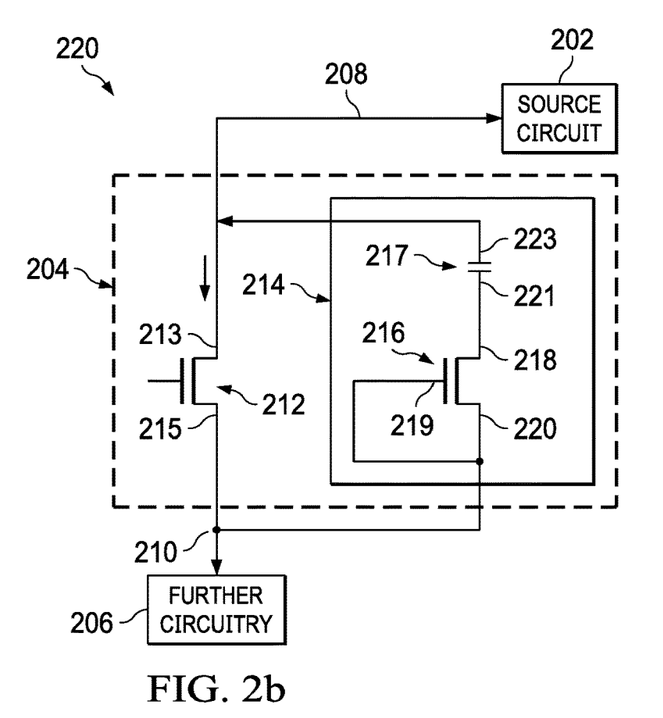

As can be seen in FIG. 2a, the first terminal 213 of the main MOSFET 212 and the first terminal 218 of the snubber MOSFET 216 are configured to couple to the supply node 208 via separate circuit paths. However, in other aspects, the first terminal 218 of the snubber MOSFET 216 may be configured to couple to the supply node 208 via a same circuit path that couples the first terminal 213 of the main MOSFET 212 to the supply node 210, as shown in the power semiconductor circuit 220 in FIG. 2b. In such aspects, as can be seen in FIG. 2b, the snubber circuit 214 further comprises a snubber capacitor element 217 having a first terminal 221 coupled to the drain terminal 218 of the snubber MOSFET 216 and having a second, different, terminal 223 configured to couple to the drain terminal 213 of the main MOSFET 212, in order to couple the first terminal 218 of the snubber MOSFET 216 to the supply node 208 via the same circuit path that couples the drain terminal 213 of the main MOSFET 212 to the supply node 208. In some aspects, the snubber capacitor element 216 comprises a monolithic capacitor realized using common IC layout techniques. In some aspects, the snubber capacitor element 217 is configured to store energy associated with the ringing voltage at the switch node 210, prior to releasing the energy to the supply node 208. All the other elements of the power semiconductor circuit 220 in FIG. 2b is similar in structure/function to the elements in FIG. 2a and is therefore not repeated herein. In some aspects, the power semiconductor circuit 220 in FIG. 2b comprises one possible way of implementation of the power semiconductor circuit 150 in FIG. 1b. In some aspects, utilizing the same circuit path for the main MOSFET 212 and the snubber MOSFET 216 enables to avoid implementing separate pins in a monolithic IC that comprises the main MOSFET 212 and the snubber MOSFET 216.

Referring back to FIG. 2a, the snubber MOSFET 216 is implemented in a diode configuration, where the gate terminal 219 of the snubber MOSFET 216 is coupled to the source terminal 220 of the snubber MOSFET 216. However, in other aspects, the gate terminal 219 of the snubber MOSFET 216 may be configured to be controlled to selectively switch ON the snubber MOSFET 216, thereby forming an active switch configuration, in order to bypass the ringing voltage to the supply node 208, as shown in the power semiconductor circuit 240 in FIG. 2c. In some aspects, the power semiconductor circuit 240 in FIG. 2c comprises another possible way of implementation of the power semiconductor circuit 100 in FIG. 1a. In some aspects, the gate terminal 219 of the snubber MOSFET 216 is controlled via a control circuit 224. In some aspects, for example in the case of MOSFETs, the control circuit 224 may include a gate driver circuit. Alternatively, in other aspects, the control circuit 224 may be implemented differently. In some aspects, the snubber MOSFET 216 is configured to be switched ON by the control circuit 224 after a predefined delay after the switch ON or switch OFF of the main switch MOSFET 212, in order to bypass the ringing voltage at the switch node 210 to the supply node 208. Alternatively, in other aspects, the snubber MOSFET 216 is configured to be switched ON by the control circuit 224 when a voltage at the switch node 210 exceeds a predefined ringing voltage threshold. However, in other aspects, the snubber MOSFET 216 may be configured to be switched ON by the control circuit 224 based on other criteria. All the other elements of the power semiconductor circuit 240 in FIG. 2c is similar in structure/function to the elements in FIG. 2a and is therefore not repeated herein.

Figure 2C:
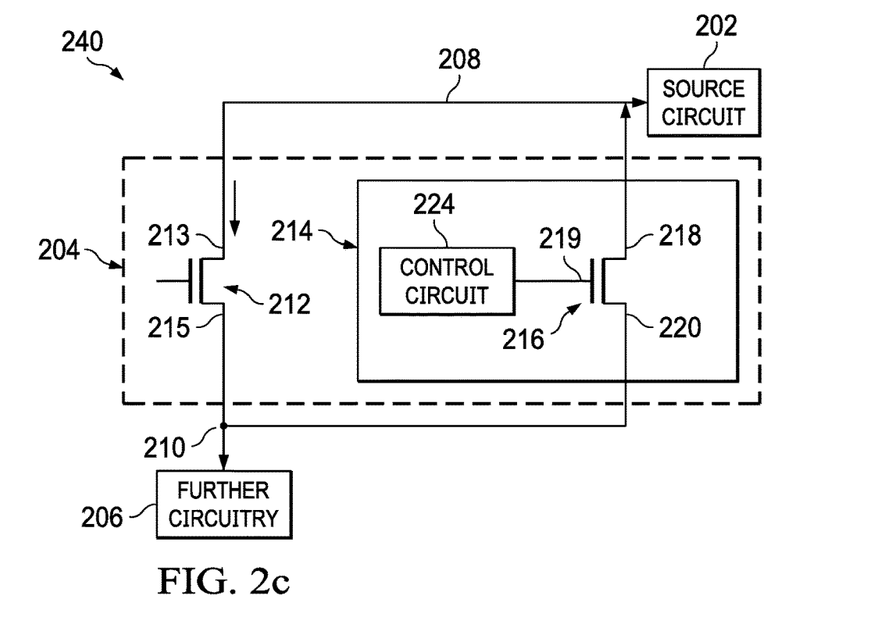
Figure 2D:
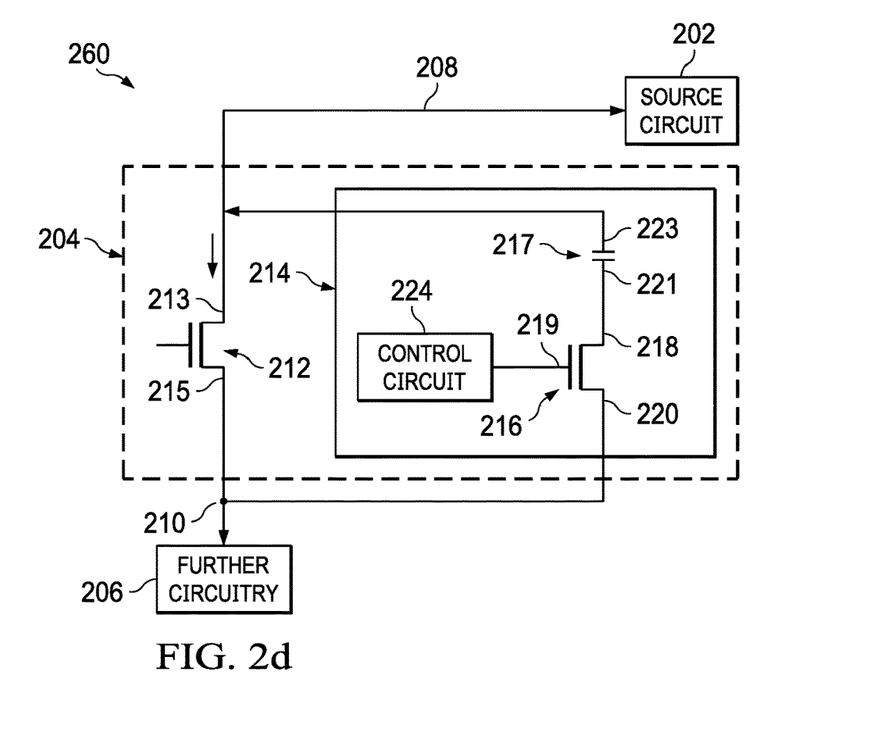

In FIG. 2c, the first terminal 213 of the main MOSFET 212 and the first terminal 218 of the snubber MOSFET 216 are configured to couple to the supply node 208 via separate circuit paths. However, in other aspects, the first terminal 218 of the snubber MOSFET 216 may be configured to couple to the supply node 208 via a same circuit path that couples the first terminal 213 of the main MOSFET 212 to the supply node 210, as shown in the power semiconductor circuit 260 in FIG. 2d. In such aspects, as can be seen in FIG. 2d, the snubber circuit 214 further comprises a snubber capacitor element 217 having a first terminal 221 coupled to the drain terminal 218 of the snubber MOSFET 216 and having a second, different, terminal 223 configured to couple to the drain terminal 213 of the main MOSFET 212, in order to couple the first terminal 218 of the snubber MOSFET 216 to the supply node 208 via the same circuit path that couples the drain terminal 213 of the main MOSFET 212 to the supply node 208, as explained above with respect to FIG. 2b and FIG. 1b above. All the other elements of the power semiconductor circuit 260 in FIG. 2d is similar in structure/function to the elements in FIG. 2c and is therefore not repeated herein. In some aspects, the power semiconductor circuit 260 in FIG. 2d comprises another possible way of implementation of the power semiconductor circuit 150 in FIG. 1b.

Figure 3:
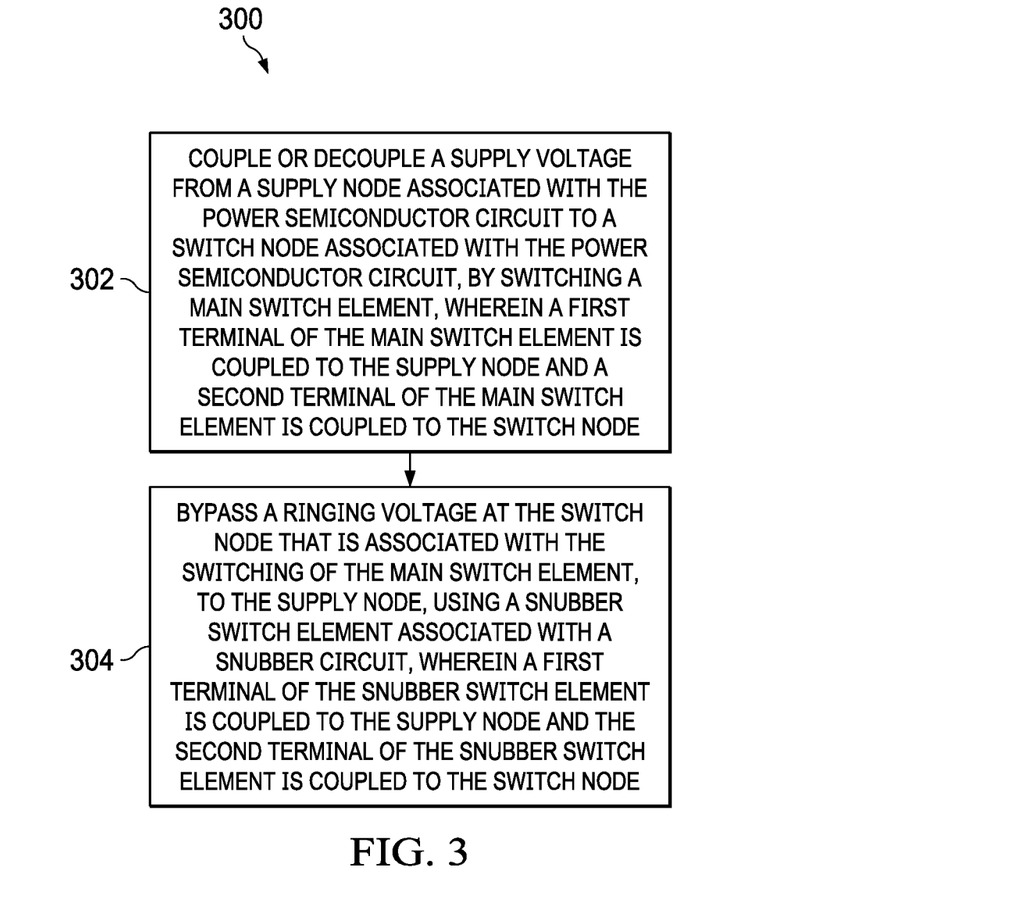
FIG. 3 is a flowchart of a method for reducing ringing voltage in a power semiconductor circuit, according to one aspect of the description

FIG. 3 is a flowchart of an example method 300 for reducing ringing voltage in a power semiconductor circuit, according to one aspect of the description. The method 300 may be implemented within the power semiconductor circuit 100 in FIG. 1 and the power semiconductor circuit 150 in FIG. 1b. Further, the method 300 is equally applicable to the power semiconductor circuits 200, 220, 240 and 260 in FIGS. 2a, 2b, 2c and 2d, respectively. At 302, a supply voltage from a supply node (e.g., the supply node 108 in FIG. 1a) associated with a power semiconductor circuit (e.g., the power semiconductor circuit 100 in FIG. 1a) is coupled or decoupled to a switch node (e.g., the switch node 110 in FIG. 1a) associated with the power semiconductor circuit, by switching a main switch element (e.g., the main switch element 112 in FIG. 1a). In some aspects, a first terminal of the main switch element is coupled to the supply node and a second terminal of the main switch element is coupled to the switch node. At 304, a ringing voltage at the switch node that is associated with the switching of the main switch element is bypassed to the supply node, by using a snubber switch element (e.g., the snubber switch element 116 in FIG. 1a) associated with a snubber circuit (e.g., the snubber circuit 114 in FIG. 1a). In some aspects, a first terminal of the snubber switch element is coupled to the supply node and the second terminal of the snubber switch element is coupled to the switch node.

As discussed in the various aspects above, the snubber circuit enables to reduce ringing voltage in a power semiconductor circuit. In some aspects, the snubber circuit enables to reduce ringing voltage by channeling the ringing voltage to a power node, thereby conserving energy associated with the power semiconductor circuit. Further, utilizing a snubber switch element within the snubber circuit facilitates monolithic implementation of the snubber circuit, thereby reducing the size of the power semiconductor circuit. In addition, due to a low inductance associated with monolithic snubber circuits utilizing the snubber switch element, the snubber circuit enables to effectively reduce ringing in high frequency switching converters.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A. Modifications are possible in the described examples, and other implementations are possible, within the scope of the claims.

What is claimed is:

1. A semiconductor switching circuit, comprising:
a snubber switch element that comprises a first terminal adapted to be coupled to a supply node of a power semiconductor circuit, a second terminal adapted to be coupled to a switch node of the power semiconductor circuit, and a third terminal coupled to the first terminal of the snubber switch element to form a snubber diode that bypasses the ringing voltage to the supply node when a voltage at the switch node exceeds the supply voltage at the supply node,
wherein the snubber switch element bypasses a ringing voltage at the switch node of the power semiconductor circuit to the supply node of the power semiconductor circuit, wherein the ringing voltage at the switch node comprises a voltage that is greater than a supply voltage associated with the supply node.

2. The semiconductor switching circuit of claim 1, further comprising a main switch element that includes a first terminal adapted to be coupled to the supply node of the power semiconductor circuit and a second terminal adapted to be coupled to the switch node of the power semiconductor circuit, and wherein the main switch element selectively couples or decouples the supply voltage at the supply node to the switch node.

3. The semiconductor switching circuit of claim 1, wherein the snubber switch element includes a third terminal that selectively switches ON the snubber switch element.

4. The semiconductor switching circuit of claim 2, wherein the second terminal of the snubber switch element is adapted to be coupled to the switch node by coupling to the second terminal of the main switch element.

5. The semiconductor switching circuit of claim 2, wherein the first terminal of the main switch element and the first terminal of the snubber switch element are adapted to be coupled to the supply node via separate circuit paths.

6. The semiconductor switching circuit of claim 2, wherein the first terminal of the snubber switch element is adapted to be coupled to the supply node via a same circuit path that couples the first terminal of the main switch element to the supply node.

7. The semiconductor switching circuit of claim 6, wherein the snubber circuit comprises a snubber capacitor element having a first terminal coupled to the first terminal of the snubber switch element and having a second, different, terminal coupled to the first terminal of the main switching element to couple the first terminal of the snubber switch element to the supply node via the same circuit path that couples the first terminal of the main switch element to the supply node.

8. The semiconductor switching circuit of claim 1, wherein the snubber switch element comprises one or more snubber switch elements in parallel.

9. The semiconductor switching circuit of claim 8, wherein a set of snubber switch elements of the one or more parallel snubber switch elements comprises one or more snubber switch elements, respectively, coupled in series to one another.

10. The semiconductor switching circuit of claim 2, wherein the main switch element and the snubber circuit are included on a monolithic integrated circuit.

11. The semiconductor switching circuit of claim 10, wherein the main switch element and the snubber switch element associated with the snubber circuit comprise sections of a same monolithic switch element.

12. A monolithic integrated circuit, comprising:
a main switch element comprising a first terminal adapted to be coupled to a supply node of a power semiconductor circuit and a second terminal adapted to be coupled to a switch node of the power semiconductor circuit, wherein the main switch element switches to selectively couple or decouple a supply voltage at the supply node to the switch node; and
a snubber switch element that includes a first terminal adapted to be coupled to the supply node, a second terminal adapted to be coupled to the switch node, and a third terminal that selectively switches ON the snubber switch element to bypass the ringing voltage to the supply node, wherein the snubber switch element bypasses a ringing voltage at the switch node of the power semiconductor circuit to the supply node of the power semiconductor circuit, wherein the ringing voltage at the switch node comprises a voltage that is greater than the supply voltage at the supply node.

13. The monolithic integrated circuit of claim 12, wherein the snubber switch element comprises a third terminal coupled to the first terminal of the snubber switch element to form a snubber diode that bypasses the ringing voltage to the supply node when a voltage at the switch node exceeds the supply voltage at the supply node.

14. The monolithic integrated circuit of claim 12, wherein the first terminal of the snubber switch element is adapted to be coupled to the supply node via a same circuit path that couples the first terminal of the main switch element to the supply node.

15. The monolithic integrated circuit of claim 14, wherein the snubber circuit comprises a snubber capacitor element having a first terminal coupled to the first terminal of the snubber switch element and having a second, different, terminal coupled to the first terminal of the main switching element to couple the first terminal of the snubber switch element to the supply node via the same circuit path that couples the first terminal of the main switch element to the supply node.

16. The monolithic integrated circuit of claim 12, wherein the snubber switch element comprises one or more snubber switch elements in parallel, and wherein a set of snubber switch elements of the one or more parallel snubber switch elements comprises one or more snubber switch elements, respectively, coupled in series to one another.

17. The monolithic integrated circuit of claim 12, wherein the main switch element and the snubber switch element comprise sections of a same monolithic switch element.

18. A method, the method comprising:
   coupling or decoupling a supply voltage from a supply node of a power semiconductor circuit to a switch node of the power semiconductor circuit by switching a main switch element, wherein a first terminal of the main switch element is coupled to the supply node and a second terminal of the main switch element is coupled to the switch node; and
   bypassing a ringing voltage at the switch node to the supply node using a snubber switch element of a snubber circuit, wherein a first terminal of the snubber switch element is coupled to the supply node, a second terminal of the snubber switch element is coupled to the switch node, a third terminal of the snubber switch element selectively switches ON the snubber switch element to bypass the ringing voltage to the supply node, and wherein the ringing voltage at the switch node comprises a voltage that is greater than the supply voltage at the supply node.

19. The method of claim 18, wherein the snubber switch element comprises a third terminal that selectively switches ON the snubber switch element to bypass the ringing voltage to the supply node.

20. The method of claim 18, wherein the first terminal of the main switch element and the first terminal of the snubber switch element are coupled to the supply node via separate circuit paths.

21. The method of claim 18, wherein the first terminal of the snubber switch element is coupled to the supply node via a same circuit path that couples the first terminal of the main switch element to the supply node.

22. The method of claim 21, wherein the snubber circuit further comprises a snubber capacitor element having a first terminal coupled to the first terminal of the snubber switch element and having a second, different, terminal coupled to the first terminal of the main switching element, thereby coupling the first terminal of the snubber switch element to the supply node via the same circuit path that couples the first terminal of the main switch element to the supply node.

* * * * *